(12) United States Patent
Schaffert

(10) Patent No.: US 9,167,744 B2
(45) Date of Patent: Oct. 27, 2015

(54) FORMING BAR WITH LIQUID DISTRIBUTION PASSAGEWAY

(75) Inventor: Paul E. Schaffert, Indianola, NE (US)

(73) Assignee: SCHAFFERT MANUFACTURING COMPANY, INC., Indianola, NE (US)

( * ) Notice: Subject to any disclaimer, the term of this patent is extended or adjusted under 35 U.S.C. 154(b) by 158 days.

(21) Appl. No.: 13/436,217

(22) Filed: Mar. 30, 2012

(65) Prior Publication Data

US 2013/0000534 A1  Jan. 3, 2013

Related U.S. Application Data

(60) Provisional application No. 61/469,411, filed on Mar. 30, 2011.

(51) Int. Cl.
*A01C 5/06* (2006.01)
*A01C 15/00* (2006.01)
*A01C 23/02* (2006.01)

(52) U.S. Cl.
CPC ............... *A01C 5/062* (2013.01); *A01C 15/008* (2013.01); *A01C 23/025* (2013.01)

(58) Field of Classification Search
CPC .... A01C 15/00; A01C 15/005; A01C 15/008; A01C 21/00; A01C 21/002; A01C 23/00; A01C 23/001; A01C 23/003; A01C 23/005; A01C 23/02; A01C 23/021; A01C 23/022; A01C 23/023; A01C 23/024; A01C 23/025; A01C 5/062; A01C 5/06; A01C 5/00
USPC .................................. 111/118–120, 123–129
See application file for complete search history.

(56) References Cited

U.S. PATENT DOCUMENTS

2009/0262003 A1* 10/2009 Allan et al. ........................ 342/5

OTHER PUBLICATIONS

Author Unknown, J.S. Ag Innovations web page, http://www.jsaginnovations.com/ planter-fertilizer-attachment-main.html (at least as early as Feb. 23, 2011).
Author Unknown, Corn & Soybean Digest web page, http://cornandsoybeandigest.com/print/consistent-seed-depth-and-extreme-durability-vali . . . (Feb. 14, 2012).
Author Unknown, Exapta Solutions web page, http://www.exapta.com/products/ valion_seed_tube_guards (at least as early as Oct. 30, 2012).
Fischer, M., "Guard for Consistency", Farm Journal Magazine web page, http://agweb.com/article/guard_for_consistency/, (Mar. 9, 2012).

* cited by examiner

*Primary Examiner* — Christopher J Novosad
(74) *Attorney, Agent, or Firm* — Dorsey & Whitney LLP

(57) ABSTRACT

A device for attaching to a shank of a planting unit. The device may include liquid delivery tubing for delivery fertilizer to a planting furrow and a forming bar configured for securing to the shank. The forming bar may include a passageway extending therethrough for receiving and passing through fertilizer or other liquid that is delivered to the liquid delivery tubing. The forming bar may include a shank connecting portion, a rib portion, and a foot portion. The rib and foot portions may define the passageway. Further, the foot portion may protect the tubing. A method for using the device to deliver fertilizer to a seed furrow is also described.

19 Claims, 5 Drawing Sheets

FORMING BAR WITH LIQUID DISTRIBUTION PASSAGEWAY

CROSS-REFERENCE TO RELATED APPLICATIONS

This application claims the benefit, under 35 U.S.C. §119 (e), of U.S. provisional patent application No. 61/469,411, entitled "Forming Bar with Liquid Distribution Aperture" and filed on Mar. 30, 2011. The entire contents of the foregoing application are hereby incorporated by reference herein as if fully set forth herein.

TECHNOLOGY FIELD

The present disclosure relates to seed planters. More particularly, the present disclosure relates to a device for shaping a furrow and depositing a liquid therein in preparation for depositing a seed or seeds.

BACKGROUND

Seed planters, particularly row crop planters, often include several seed planting units transversely arranged relative to a travel direction of the planter. The seed planting units commonly include a pair of furrowing discs that create a furrow as they move across the ground. The seed planting units may also include a hopper for carrying seeds to be planted. The seeds may be selectively released from the hopper and passed through a seed tube extending down between or slightly behind the furrowing discs. As such, the seed in the seed tube may be passed to the furrow created in the ground by the furrowing discs. To better prepare the furrow for passage of the seed tube and placement of the seed, the planting unit may also include a leading device that extends into the furrow between or slightly behind the furrowing discs, but ahead of the seed tube. In some cases, fertilization tubing, for example metal tubing, may be provided that is connected to a source of liquid fertilizer or other liquid on the planting unit. The tubing may be attached to the leading device to place liquid starter fertilizer in the furrow ahead of the seed. Additionally, this allows for the liquid to be placed beneath the seed and not on top.

Problems with current systems can occur due to engagement of the fertilization tubing with the ground. In some cases, the unprotected tubing may be agitated due to dragging along the ground causing the released fertilizer to splatter. In other cases, while metal tubing may be provided, the fertilization tubing may experience wear as it passes through the furrow ultimately leading to a leak in the tubing. In both cases, the fertilizer may spray or splatter on components of the planter. For example, the fertilizer may splatter onto the furrowing discs causing it to be further spread onto other portions of the planter due to the spinning motion of the furrowing discs. The liquid splatter on the disc can also cause seeds to adhere thereto. In addition to wasting fertilizer, this splattering fertilizer can be corrosive to equipment requiring difficult cleaning or accelerated deterioration of equipment.

BRIEF SUMMARY

In one embodiment, a device for attaching to a shank of a planting unit may be provided. The device may be particularly adapted for use with a planting unit including a liquid delivery tubing for delivering fertilizer, or other liquid, to a planting furrow. The device may include a forming bar configured for securing to the shank. The forming bar may include a rib portion, a foot portion, and a passageway arranged between the rib portion and the foot portion. The passageway may be configured for receiving and passing through the fertilizer, or other liquid.

In another embodiment, a method of delivering fertilizer to a seed furrow may be provided. The method may include moving a planting unit along a path to create the furrow. The planting unit may include furrowing discs to create the furrow with a forming bar positioned there between. The planting unit may further include a liquid delivery tubing extending from a source of liquid to the forming bar. The forming bar may include a rib portion, a foot portion and a passageway arranged between the rib portion and the foot portion. The method may include delivering liquid from the liquid source through the liquid delivery tubing and through the passageway of the forming bar to the furrow.

While multiple embodiments of devices for a planter are disclosed, still other embodiments will become apparent to those skilled in the art from the following detailed description, which shows and describes illustrative embodiments of devices for a planter. The various embodiments are capable of modifications in various obvious aspects. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of devices for a planter, it is believed that the disclosure will be better understood from the following description taken in conjunction with the accompanying figures, in which:

DETAILED DESCRIPTION

Forming bars for leading a seed tube through a planting furrow, preparing the furrow for placement of a seed, and depositing liquid in the furrow are described herein. The forming bars may be secured to a shank of a planting unit and positioned between furrowing discs on the unit. The forming bars may include a passageway for receiving and passing fertilizer therethrough. The passageway may take the form of an aperture. The tubing used herein may be a flexible tubing, a metal tubing, or any other suitable tubing. The tubing may be protected by the forming bar. In this protected condition, wear on the tubing may be reduced. Further, the tubing may be positioned relative to the forming bar to allow for controlled placement of liquid, for example fertilizer, in the furrow. The liquid may be inoculants, pesticides, fertilizer, or many other liquids needing placement into or near the furrow.

Figure 1:
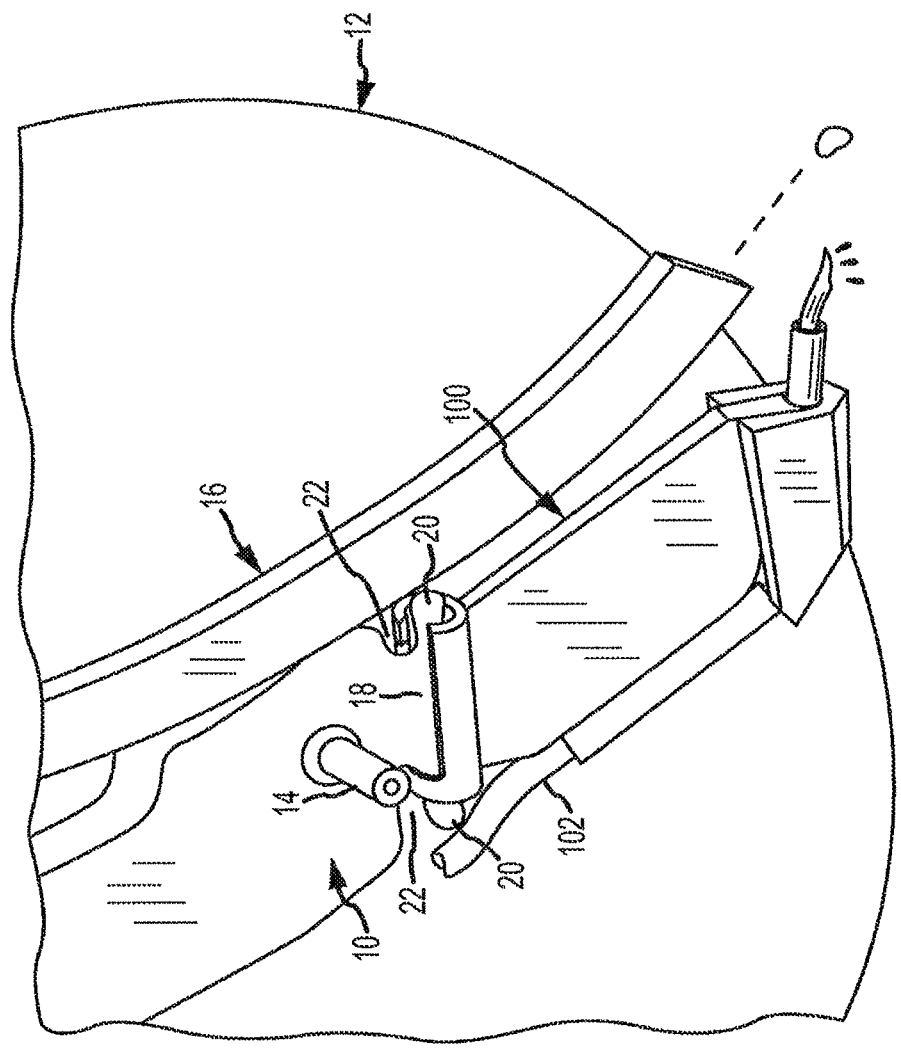
FIG. 1 is a perspective view of a forming bar positioned on a shank of a planting unit for preparing a furrow with starter fertilizer prior to placing a seed therein, according to certain embodiments.

Referring to FIG. 1, a perspective view of a forming bar 100 positioned on a shank 10 of a planting unit is shown. The planting unit may include a furrowing disc 12 supported on a shaft 14 passing through the downward extending shank 10 of a seed planting unit. The unit may include a pair of discs 12 for creating a furrow. The near disc 12 is omitted in this view to reveal the elements between the discs 12. The furrowing discs 12 may be adjusted upward or downward to a desired furrow depth relative to a ground surface. A seed tube 16 may extend along the aft side of the downward extending shank 10, and the forming bar 100 may be connected to the shank 10. Tubing 102 may lead to the forming bar 100 from a source of liquid. The portion shown may be moved along the ground such that the discs 12 create a furrow, the seed tube 16 extends down between the discs 12, and the forming bar 100 leads the seed tube 16 along the furrow. The forming bar 100 may prepare the furrow for seed placement and further allow for placement of liquid fertilizer, or other liquid, therein prior to intermittent delivery of seeds to the furrow. The timing of the seed delivery and the rate of fertilizer delivery may each be coordinated with the speed of the planter to provide a suitable amount of fertilizer and proper seed spacing for the crop being planted. The forming bar as described herein may have a benefit in making the seed placement more even in the furrow.

Figure 2:
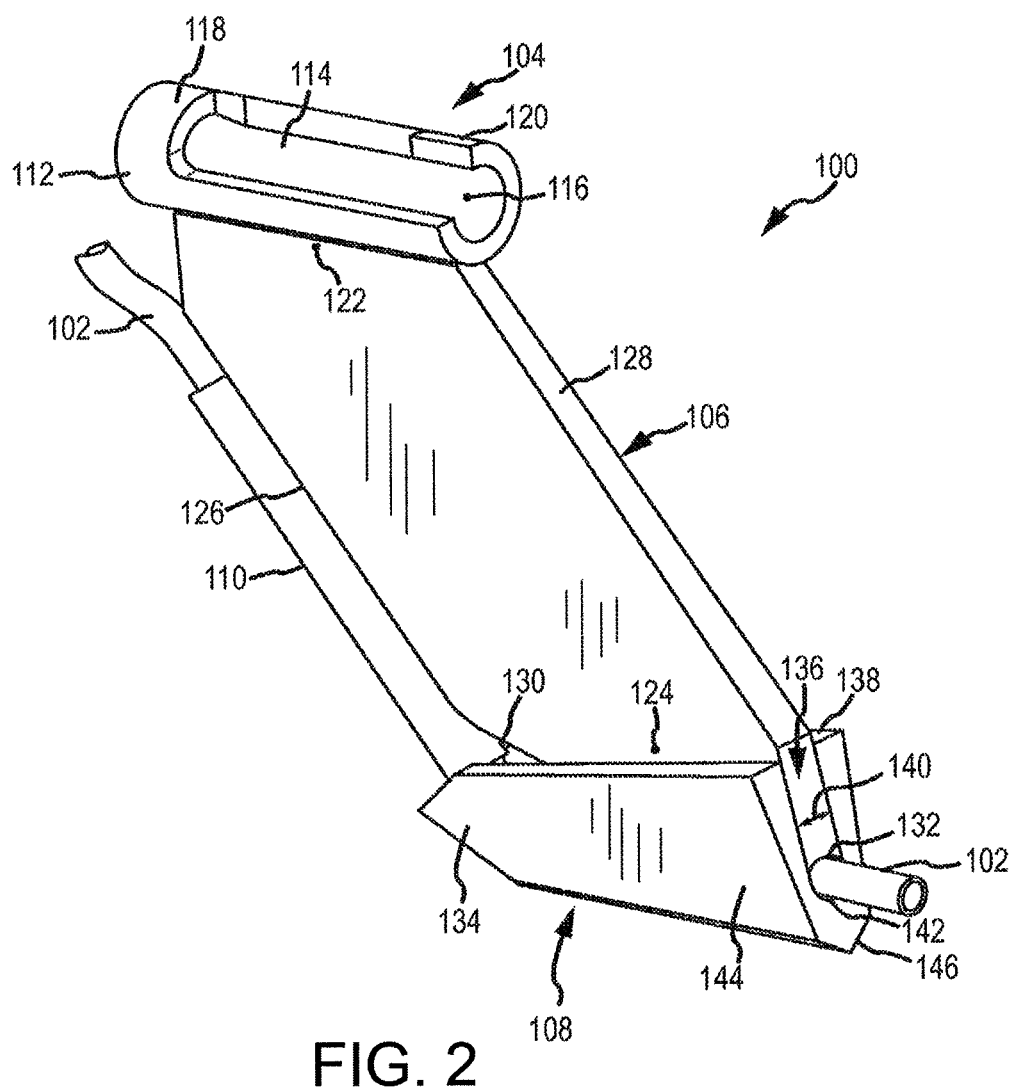
FIG. 2 is a close-up perspective view of the forming bar of FIG. 1.

Referring now to FIG. 2, a close-up perspective view of the forming bar 100 of FIG. 1 is shown. The forming bar 100 may be configured for attachment to a shank 10 as shown in FIG. 1 and for leading a seed tube 16 through a furrow. The forming bar 100 may be further adapted to prepare the furrow for seed placement and to deposit a liquid fertilizer in the furrow. The forming bar 100 may include a shank connecting portion 104, a rib portion 106, a foot portion 108, and a leading sleeve 110. A fertilizer tubing 102, for example, a flexible polyurethane, polyethylene, or other material tubing may be sleevably passed through a passageway taking the form of, for example but not limited to, an aperture, formed in, or in association with, the forming bar 100 to protect the tubing 102 as the tubing 102 and forming bar 100 are pulled along a furrow. Liquid fertilizer, for example starter fertilizer, may be pumped or otherwise delivered through the tubing 102 as the planting process is performed. The liquid flowing through the forming bar may place the liquid disbursed therefrom to the backside of the disc so it is not likely to build up on the disc itself.

The shank connecting portion 104 may be configured to engage the shank 10 of the planting unit and resist dislodgement under forces imparted during planting operations. With reference to FIG. 1, the shank 10 of the planting unit may include an engagement feature in the form of an ear portion 18 having front and back tabs 20 defining corresponding front and back notches 22. As such, the shank connecting portion 104 of the forming bar 100 will be described as being configured for engaging this type of engagement feature on the shank 10. However, other manufacturers of planters may provide alternative engagement features. As such, alternative shank connecting portions 104 may be provided on the forming bar 100 for suitably engaging such engagement features.

With reference to FIGS. 1 and 2, the shank connecting portion 104 may include a generally block-shaped mass 112 having a slot 114 arranged therein leading to a central cavity 116 for receiving the ear 18 of the shank 10 on the planting unit. In some embodiments, the mass 112 may be generally cylindrically shaped or the mass 112 may be rectangular in shape. Other shapes may also be provided. The cavity 116 may pass through the block-shaped mass 112 at each end. A bridge 118 may be provided that extends fully across the open side of the slot 114 at one end of the cavity 116, and a catch 120 may be provided that extends partially across the open side of the slot 114 at an opposite end of the cavity 116. The slot 114, cavity 116, bridge 118, and catch 120 may cooperate to secure the forming bar 100 to the ear 18 on the shank 10 of the planting unit as will be described with respect to the method discussed below.

The rib portion 106 of the forming bar 100 may be configured to extend from the block-shaped mass 112 to support the foot portion 108. The rib portion 106 may further be configured to cut through debris or other matter in the furrow as it follows the furrowing discs 12. The rib portion 106 may extend from a first end 122 at the block-shaped mass 112 in a direction generally opposite the open side of the slot 114 to a second end 124. The rib portion 106 may be generally plate-like having front and rear edges 126, 128 and may be arranged with its broad surfaces substantially parallel to the travel direction. The rib portion 106 may have a thickness substantially equal to the outer diameter of the tubing 102. Other thicknesses may also be provided. For example, thicknesses larger than the tubing diameter or less than the tubing diameter may be provided. The front and rear edges 126, 128 may be generally parallel with one another, or the rib portion 106 may taper as it extends away from the shank connecting portion 104. In some embodiments, the front edge 126 of the rib portion 106 may include a chamfered edge 130 leading to a bottom edge 132. In some embodiments, the rib portion 106 may be inclined or tipped forward to facilitate pulling the forming bar 100 through the furrow. The bottom edge 132 of the rib portion 106 may be configured to contact a fertilizer tubing 102 extending along the bottom edge 132. As such, the bottom edge 132 may include a tube receiving feature and may be concave to nestably engage the tubing 102. In other embodiments, the bottom edge 132 of the rib portion 106 may be a square or other suitably shaped edge.

The foot portion 108 of the forming bar 100 may be configured for positioning along the bottom edge 132 of the rib portion 106 and for receiving at least some of the rib portion 106 therein. The foot portion 108 may further be configured for preparing the bottom of the furrow for seed placement by pressing against the sides and bottom of the furrow and by pushing lumps of soil or other debris away from the furrow. The foot portion 108 may be a generally solid mass 134 with a slot 136 extending through a top surface 138 and into the mass 134. The slot 136 may have a width 140 substantially equal to the rib portion 106 for receiving the rib portion 106 therein. The slot 136 may be configured to have a tubing 102 placed along its bottom surface 142 and, as such, may have a longitudinally extending bottom surface 142 having a tube receiving feature. The feature may be in the form of a concave cross-section of the bottom surface 142. In other embodiments, the bottom surface 142 of the slot 136 may be substantially flat.

The slot 136 passing into the top of the mass 134 may define two sidewalls 144 positioned on either side of the slot 136. The sidewalls 144 may extend upward from the bottom surface 142 of the slot 136 along each side of the rib portion 106 and may converge to form a bottom 146 of the foot 108 below the bottom surface 142 of the slot 136. The sidewalls 144 may be tapered in thickness from top to bottom by having inclined outer surfaces. In some embodiments, the outer surfaces of the sidewalls 144 may be additionally inclined as they approach the bottom of the foot and may come together at a point. The dual tapered nature of the outer surfaces of the sidewalls 144 may create a relatively wide v-shape in the furrow with relatively steep sides near their top portion, with a converging, but shallower sloping v-shape near the bottom of the sides of the furrow. In some embodiments, the outer surface of the sidewalls 144 may be further tapered from back to front creating a wedge shape, when viewed from above or below, where the wedge is directed in the travel direction along the furrow. Near the front portion of the foot 108, the sidewalls 144 may be mitered or clipped to form a front facing point when viewed from the side. The foot 108 may have a length slightly larger than the length of the bottom edge 132 of the rib portion 106 and may extend forwardly from the front edge 126 of the rib portion 106. The portion of the sidewalls 144 and the slot 136 extending forwardly from the rib portion 106 and arranged below the inclined front edge 126 and chamfered edge 130 of the rib portion 106 may create a protected landing. This may allow the tubing 102 to transition from the sloped orientation along the front edge 126 of the rib portion 106 to an orientation passing along the bottom surface 142 of the slot 136 in the foot 108.

The foot 108 may be welded, bolted, adhered, or otherwise secured to the rib portion 106. When in place on the rib portion 106, the bottom 142 of the slot 136 in the foot 108 and the bottom edge 132 of the rib portion 106 may form a generally cylindrical passageway extending through the forming bar 100 leading from the front to the rear of the forming bar 100. The passageway may be sized to receive the fertilizer tubing 102. As such, the concavity of the bottom edge 132 of the rib portion 106 and the bottom surface 142 of the slot 136 may be sized and shaped to receive the tubing 102 and may thus have a radius of concavity substantially equal to or slightly larger than the tubing 102. For example, the radius of the concave surfaces may range from approximately ⅛" to approximately 1". In other embodiments, the radius may range from approximately 3/16" to approximately ½". In still other embodiments, the radius may range from approximately ¼" to approximately 5/16". Other radiuses and resulting passageway sizes may be provided. Where the thickness of the rib portion 106 and the width 140 of the slot 136 are substantially equal to the diameter of the tubing 102, these dimension may be approximately double the radius ranges mentioned. For example, for a ½" diameter tube 102, the radius dimensions for the concave bottom surface 142 and bottom edge 132 may be approximately ¼" and the rib portion 106 and slot 136 may have a respective thickness and width 140 of approximately ½".

The cylindrical passageway may protect the tubing 102 from contact with the bottom or walls of the furrow thereby preventing wear or perforation of the tubing 102. The tubing 102 may extend slightly out the back side of the foot 108 creating a drip edge. The passageway may have a generally horizontal orientation. In other embodiments, the passageway may be inclined or tipped as it passes through the foot 108. In still other embodiments, the passageway may be inclined along a portion of its length and may curve to a generally horizontal orientation near the back edge of the foot 108. Where the tubing 102 extending from the back edge of the foot 108 is substantially horizontal, the tubing may track through the furrow and remain in a travel shadow of the foot 108. As such, the tubing 102 may avoid dragging on or otherwise contacting the walls or bottom of the furrow thereby preventing agitation and splatter of the released liquid. In other embodiments, the tubing 102 may extend from the back of the foot in an inclined or tipped orientation. In these embodiments, the length of extension of tubing 102 out of the foot 108 may be selected to maintain the end of the tubing 102 within the travel shadow of the foot 108 to avoid dragging or contacting the furrow. In still other embodiments, the tubing 102 may stop flush with the back edge of the foot 108 and may intersect the back edge of the foot perpendicularly or at an angle less than 90°.

The forming bar 100 may further include a leading sleeve 110. The leading sleeve 110 may be arranged along the front edge 126 of the rib portion 106 and may be configured for protecting the portion of tubing 102 positioned along the front edge 126 of the forming bar 100. The leading sleeve 110 may include a generally cylindrically shaped sleeve 110 having an aperture extending therethrough for receiving the tubing 102. The sleeve 110 may have other cross-sections as well, including rectangular, triangular, or others. The leading sleeve 110 may be secured to the front edge 126 of the rib portion 106. The leading sleeve 110 may also engage the protected landing on the front portion of the foot 108 and be secured thereto. In some embodiments the sidewalls 144 of the foot 108 may be flared near the intersection with the leading sleeve 110 allowing the leading sleeve 110 to nest between the sidewalls 144. Where the leading sleeve 110, sidewalls 144, and chamfered edge 130 of the rib portion 106 come together, a gap may be formed This gap may be useful for manipulation of the tubing 102 as it is passed through this region, for maintenance or the like. The gap may also be filled in or not formed at all.

In alternative embodiments, the leading sleeve 110 may be loose and not secured to the other portions of the forming bar 100. In still other embodiments, the leading sleeve 110 may be integral with the rib portion 106 (such as one-piece or separately formed but permanently attached). In this embodiment, where the rib portion 106 has a thickness substantially similar to the tubing 102, the leading sleeve 110 may include a widened or thickened portion thereof extending along the front edge 126 and having an aperture extending therethrough. The aperture may be continuous with the passageway extending between the foot 108 and the rib portion 106. That is, the aperture may extend through the leading sleeve portion 110 along the front edge 126 of the rib portion 106 and may then transition through a curve and pass between the foot 108 and rib portion 106 out the back of the forming bar 100.

The forming bar 100 described may be removably connected to a shank 10 of a planting unit. The shank connecting portion 104 may be positioned below and slightly forward of the ear 18 on the shank 10 of the planting unit. The forming bar 100 may be tipped slightly to the side and may be moved upward to receive the ear 18 of the shank 10 through the slot 114 and into the cavity 116 of the block-shaped mass 112. The forward position of the forming bar 100 may allow the front tab 20 on the ear 18 to clear the bridge 118 of the block-shaped mass 112 and tipping the forming bar 100 may allow the back tab 20 on the ear 18 to clear the catch 120 of the block-shaped mass 112. The forming bar 100 may then be moved rearward allowing the front tab 20 of the ear 18 to pass below the bridge 118 further allowing the bridge 118 to engage the front notch 22 on the shank 10. The forming bar 100 may further be rotated from a tipped orientation to an upright orientation causing the catch 120 to engage the back notch 22 on the shank 10 thereby suspending the forming bar 100 from the front and back tabs 20 of the ear 18.

Tubing 102 for administering starter fertilizer or other liquids may be threaded downward through the leading sleeve 110 to the protected landing on the front portion of the foot 108. The user may rely on the access slots rearward of the leading sleeve 110 and near the bottom of the leading sleeve 110 to direct the tubing 102 through the slot 136 in the foot 108 and further advance the tubing 102 to the back portion of the forming bar 100. The tubing 102 may be inserted into the forming bar 100 prior to or after the forming bar 100 is secured to the shank 10.

After joining the forming bar 100 with the tubing 102 to a planting unit, the planting unit may be moved within a field along a path to create the furrow. As the planting unit creates the furrow, liquid from a liquid source may be placed into the furrow by passing the liquid or other fluid through the liquid delivery tubing 102 and through the passageway of the forming bar 100. In some embodiments, the tubing 102 extends through the passageway of the forming bar. In these embodiments, delivering the liquid through the forming bar comprises delivering the liquid through a portion of the liquid delivery tubing 102 passing through the passageway. In other embodiments, the tubing 102 is connected to the forming bar 102. In these embodiments, delivering the liquid through the forming bar 100 comprises delivering the liquid through the passageway in the forming bar 100.

Figure 3:
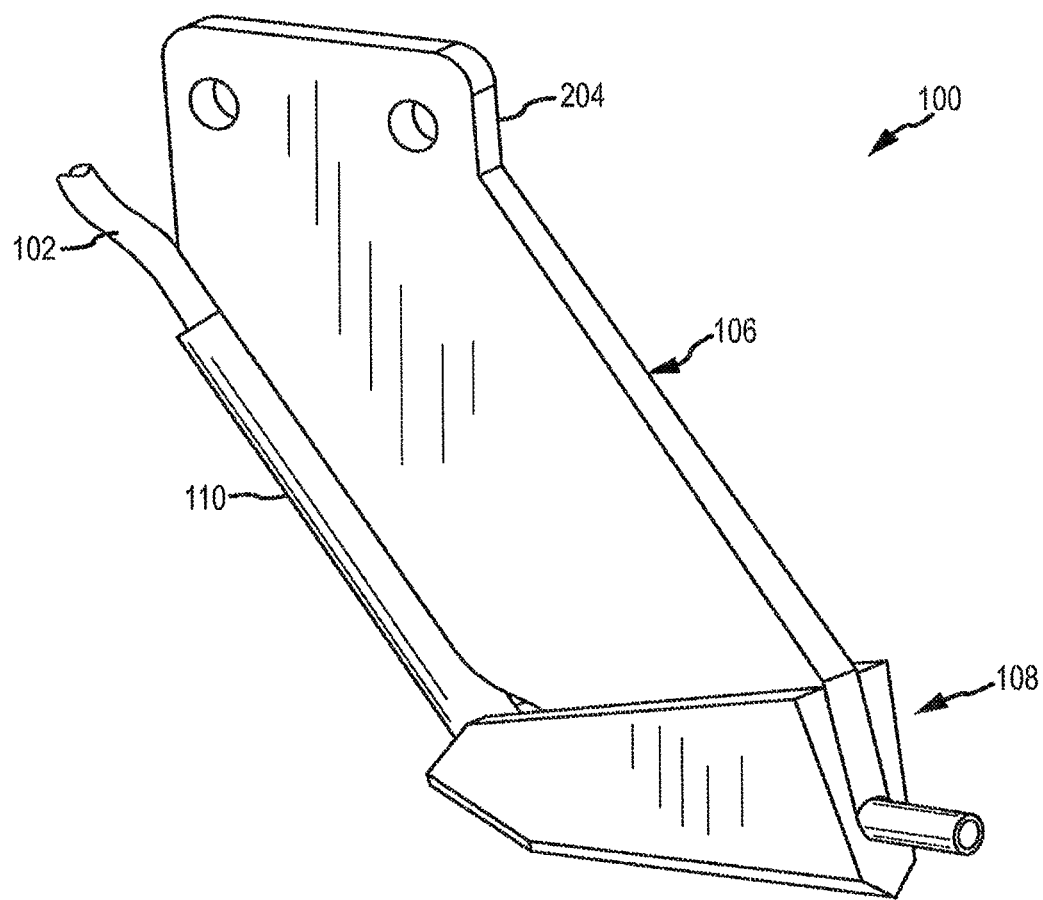
FIG. 3 is a perspective view of another forming bar according to certain embodiments.

The forming bar 100 may include a variety of shank connecting portions. Referring now to FIG. 3, a tab-like shank connecting portion 204 may be provided. In this embodiment, the tab-like shank connecting portion 204 may include apertures for fastening the forming bar 100 to the shank 10 of the planting unit. The tab-like portion 204 may be positioned adjacent to the shank 10 and the apertures may be aligned with corresponding apertures in the shank 10. Fasteners may be provided and passed through the aligned apertures to secure the forming bar 100 to the shank 10.

Figure 2A:
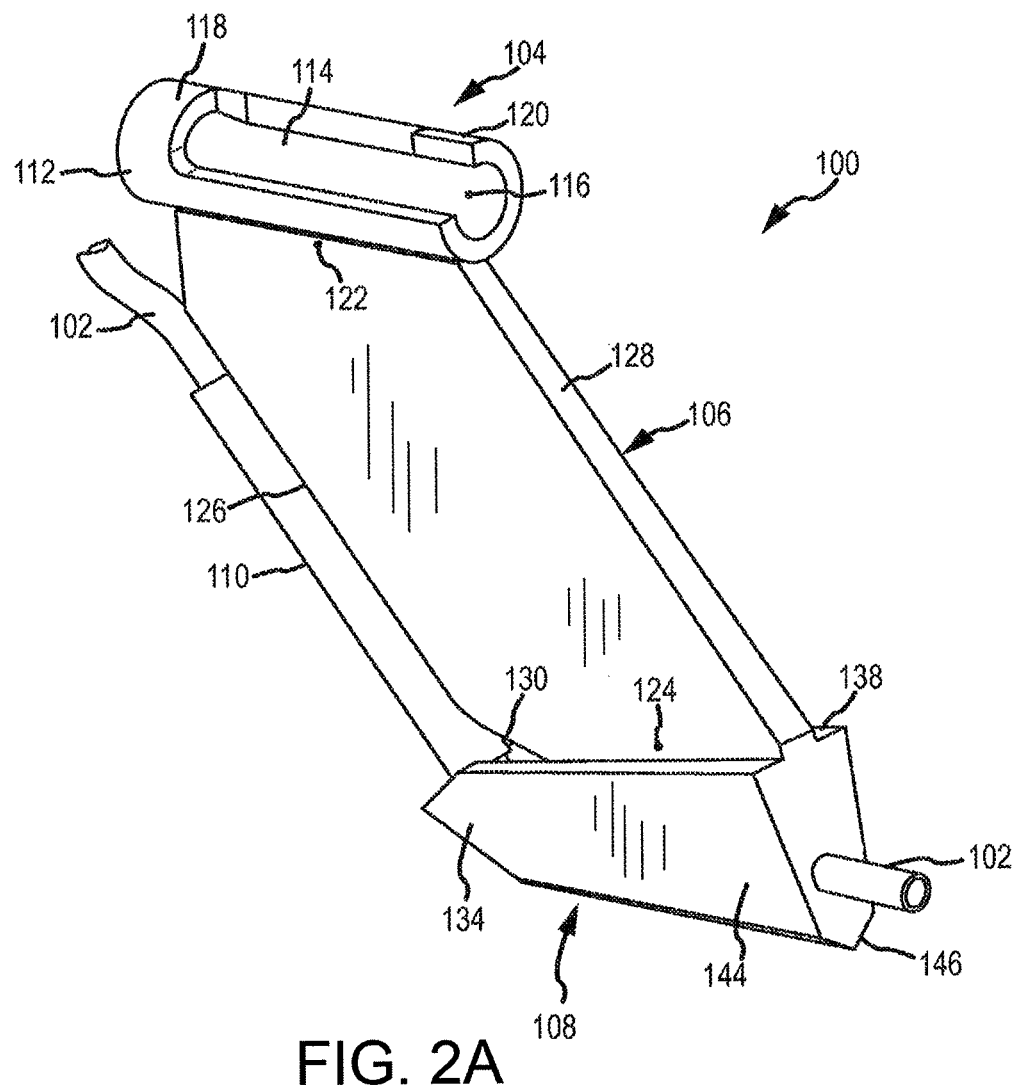
FIG. 2A is a close-up perspective view of the forming bar of FIG. 1 with the shank connecting portion, the rib portion, and the foot portion integrally formed as a single piece.
Figure 3A:
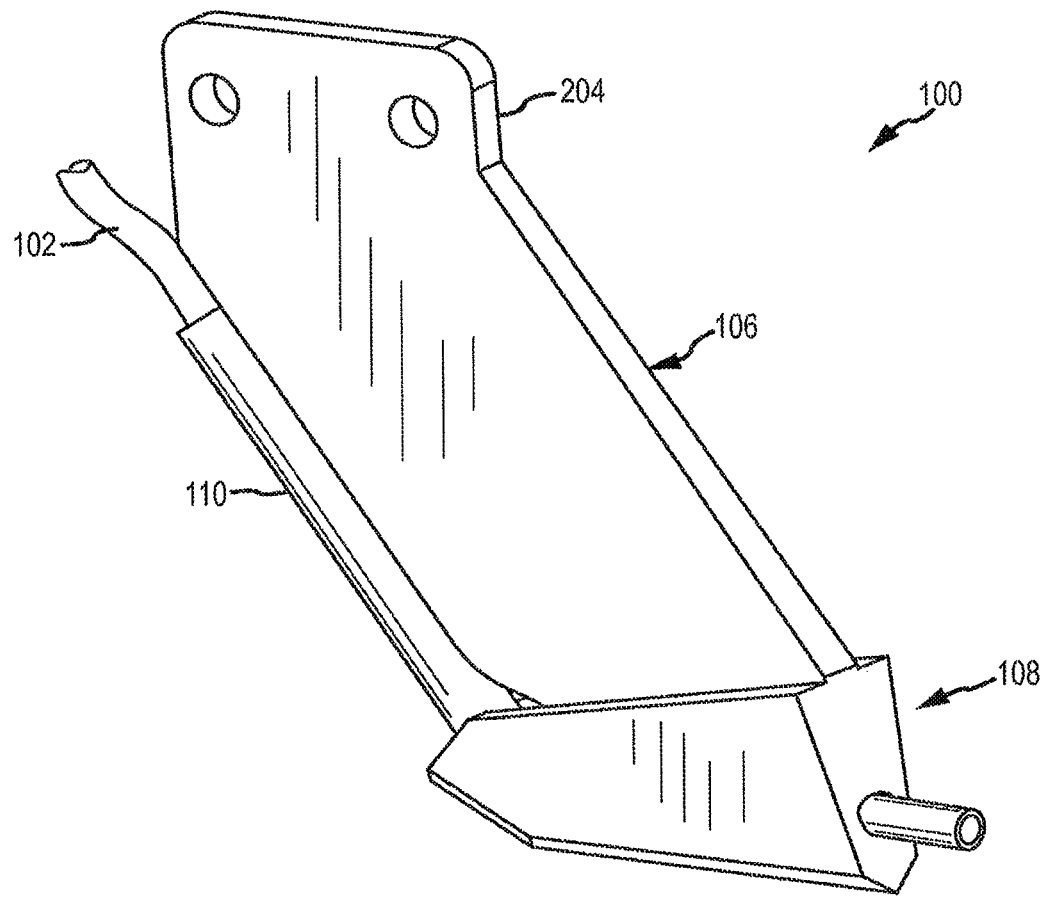
FIG. 3A is a perspective view of the forming bar of FIG. 3 with the shank connecting portion, the rib portion, and the foot portion integrally formed as a single piece.

The forming bars 100 described herein may be a built up shape where each of the portions (shank connecting, rib, and foot) are separately formed and then secured to one another by welding, adhering, or otherwise fastening the several portions together. In other embodiments, some or all of the several portions may be made integral by casting, molding, or extruding them as single pieces. In FIGS. 2A and 3A, the shank connecting portion 104, 204, the rib portion 106, and the foot portion 108 are integrally formed as a single piece.

The forming bar 100 may be made from durable materials and may include wear resistant materials. For example, the forming bar 100 may be made from steel, steel alloy (including chromium among other possible alloy materials), or other metal materials. Other materials may also be provided. In some embodiments, the forming bar 100 may be made corrosion resistant by making it from stainless steel or other corrosion resistant materials. In other embodiments the forming bar 100 may be galvanized or painted to protect against corrosion. Other coated or uncoated materials may be provided.

The embodiments described herein are exemplary. Modifications and changes to the embodiments described are still within the scope of the present disclosure. For example, in some embodiments, where the thickness of the rib portion 106 and the width 140 of slot 136 in the foot 108 are less than the tubing diameter 102, the tube receiving feature in the bottom surface 142 of the slot 136 may be in the form of a cylindrical or other shaped keyway for receiving the tubing 102 therethrough. In other embodiments, for example, where the thickness of the rib portion 106 and the width 140 of the slot 136 are greater than the tubing diameter, the bottom surface 142 of the slot 136 may be adapted to mate with the bottom edge 142 of the rib portion 106 and the tube receiving feature may be in the form of a groove or other tube accommodating shape formed in the bottom surface 142 of the slot 136 and the bottom edge 132 of the rib portion 106. In still other embodiments, the bottom surface 142 of the slot 136 and the bottom edge 132 of the rib portion 106 may be spaced apart to allow for passage of the tubing 102 therethrough and receiving features may be omitted.

In still other embodiments, the shape of the rib portion 106 and the shape of the slot 136 in the foot 108 may be configured to prevent parting of the two pieces. For example, the second end 124 of the rib portion 106 arranged in the slot 136 may have diverging surfaces, in a top to bottom direction, and the inner surfaces of the sidewalls 144 of the slot 136 may correspondingly diverge. As such, the rib portion 106 may be inserted into the slot 136 by sliding the rib portion 106 from the back side of the foot 108 in a forward direction relative to the foot 108. The diverging surfaces may thus prevent parting of the rib portion 106 and the foot 108 where the rib portion 106 is pulled upward relative to the foot 108. Other interlocking or keyed type connections between the rib 106 and foot 108 or other portions of the forming bar 100 may also be provided. For example, the leading sleeve 110 may have a key extending along is rear edge for engaging a keyway in the front inclined edge 126 of the rib portion 106 or vice versa. Other connections between the several parts may also be provided.

In still other embodiments, the passageway in the forming bar 100 may be configured to function as a liquid supplying conduit. That is, the liquid tubing 102, for example, may be fastened to the forming bar 100 and placed into fluid communication with the passageway extending therethrough. The passageway defined by the forming bar 100 may transport the liquid through the forming bar 100 and deliver the liquid to the furrow, for example, out the back thereof. In this embodiment, the passageway may be substantially fluid tight and may have a round cross-section, square cross-section, or other cross-section. The forming bar 100 may include any of a variety of tubing connection features for connecting the tubing 102 and allowing the liquid to pass from the tubing 102 into the passageway of the forming bar 100. For example a hose bib type connection may be provided and the tubing 102 may be pressed onto the hose bib and secured with a hose clamp.

The forming bar may ride between the discs and be arranged about ½" above the bottom of the discs that form the seed furrow (or also "V"). The forming bar may provide a smooth surface for the inside of the disc blades to run against. The forming bar may hold the 2 discs apart so that they make the proper size seed V opening. The forming bar when new may be wider than the seed tube thus holding the disc apart so the discs do not rub on the outside of the seed tube (at the bottom of the seed tube). At the bottom of the seed tube opening the tube may measure about ¾" across and the wear guard or forming bar, when new, may measure ⅞" across the bottom. The forming bar may be made of a softer material than the discs because they are constantly rubbing together. As the forming bar wears down, for instance to below ¾" in width, the discs may start rubbing on the seed tube at the bottom opening. As they wear into the seed tube they can cause a hook feature to protrude on the inside of the tube where the seeds exit the seed tube to fall into the seed V. With this hook made by the discs rubbing the metal or plastic seed tube, seeds may be caused to hit this hook, or curled in piece of metal or plastic, thus causing them to bounce out of the seed V or let them catch up with other seeds coming down the tube. Planting units may often be operated at an approximately 5 miles per hour planting speed. At this speed, the seeds may be falling at a relatively high rate of speed. This 5 mile per hour speed for planters is commonly the speed that many planter or drill manufacturers consider to be optimum planting speed, which is why the forming bar is may be advantageous between the discs.

The forming bar may also act as a scraper for mud or moist soils to keep them from building up between the discs.

The forming bar may hold the discs apart and resist outside pressure from the outside of the discs that are engaging the soil to wedge the V open in firm soils. This outside pressure from the wedge effect of the discs may put much pressure on the forming bar, causing wear when soils are hard and possibly dry. Many no-till farmers find that the forming bar wears out a lot quicker in no-till soils than it does in worked ground due to the firmness of the soils the discs are running in. Many times farmers may be forced to change the forming bar several times before they change the discs with wear.

The forming bar described herein may also work with single disc openers.

All directional references (e.g., upper, lower, upward, downward, left, right, leftward, rightward, top, bottom, front, back, front facing, rear facing, leading, trailing, above, below, inner, outer, vertical, horizontal, clockwise, counterclockwise, and the like) are only used for identification purposes to aid the reader's understanding of the examples of the disclosure, and do not create limitations, particularly as to the position, orientation, or use of the disclosure unless specifically set forth in the claims. Joinder references (e.g., attached, coupled, connected, joined, and the like) are to be construed broadly and may include intermediate members between a connection of elements and relative movement between elements. As such, joinder references do not necessarily infer that two elements are directly connected and/or in fixed relation to each other.

In some instances, components are described with reference to "end" or "edge" having a particular characteristic and/or being connected with another part. However, those skilled in the art will recognize that the present disclosure is not limited to components which terminate immediately beyond their points of connection with other parts. Thus, the terms "end" and "edge" should be interpreted broadly, in a manner that includes areas adjacent, rearward, forward of, or otherwise near the terminus of a particular element, link, component, part, member or the like.

In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present disclosure. It is intended that all matter contained in the above description or shown in the accompanying drawings shall be interpreted as illustrative only and not limiting. Changes in detail or structure may be made without departing from the spirit of the disclosure as defined in the appended claims.

Although the present disclosure has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the disclosure. Accordingly, the proper scope of the disclosure is defined by the appended claims. The various embodiments, operations, components and configurations disclosed herein are generally exemplary rather than limiting in scope.

What is claimed is:

1. A device for attaching to a shank of a planting unit for use with a planting unit including a liquid delivery tubing for delivering fertilizer to a planting furrow, the device comprising a forming bar configured for securing to the shank, the forming bar including a rib portion and a foot portion, wherein the rib portion includes a front edge, rear edge, and bottom edge with the foot portion extending downward from the bottom edge of the rib portion, the foot portion at least partially defining a passageway configured to receive the liquid delivery tubing.

2. The device of claim 1, wherein the passageway is oriented to extend generally horizontally out the back of the forming bar proximal to the rear edge.

3. The device of claim 1, wherein the rib portion and foot portion are configured to pass the liquid delivery tubing therebetween and include corresponding tube receiving features.

4. The device of claim 3, wherein the tube receiving feature in the rib portion includes a concave bottom edge, and the tube receiving feature in the foot portion includes a concave surface.

5. The device of claim 1, wherein the rib portion substantially forms a plate having a thickness, the foot portion includes a slot for receiving the rib portion therein, and the slot includes a width substantially equal to the thickness of the rib portion.

6. The device of claim 5, wherein the thickness of the rib portion and the width of the slot are substantially equal to an outer diameter of the liquid delivery tubing.

7. The device of claim 1, wherein the forming bar further comprises a leading sleeve for receiving the liquid delivery tubing therethrough.

8. The device of claim 7, wherein the leading sleeve is adjacent the front edge.

9. The device of claim 1, further comprising a shank connecting portion.

10. The device of claim 9, wherein the shank connecting portion includes a mass including a slot leading to a cavity for receiving a portion of the shank therein.

11. The device of claim 10, wherein the mass further comprises a bridge and a catch for securing the forming bar to the shank.

12. The device of claim 9, wherein the shank connecting portion includes a tab portion including apertures extending therethrough.

13. The device of claim 1, wherein the rib portion and foot portion are secured by a welded connection.

14. The device of claim 1, wherein the rib portion and the foot portion are each parts of a single integral piece.

15. The device of claim 1, wherein the forming bar further comprises a tubing connection feature.

16. The device of claim 15, wherein the tubing connection feature comprises a sleeve.

17. The device of claim 1, further comprising a shank connecting portion attachable to the shank to secure the device to the planting unit.

18. The device of claim 17, wherein the rib portion extends between the shank connecting portion and the foot portion.

19. The device of claim 1, wherein the liquid delivery tube includes a portion of the liquid delivery tube that is sandwiched between the rib portion and the foot portion within the passageway and the portion of the liquid deliver tube extends from the front edge to the rear edge.

* * * * *